(12) United States Patent
Sesing et al.

(10) Patent No.: US 8,097,232 B2
(45) Date of Patent: Jan. 17, 2012

(54) METHOD FOR PRODUCING CHLORINE

(75) Inventors: Martin Sesing, Waldsee (DE); Armin Diefenbacher, Germersheim (DE); Hartwig Voss, Frankenthal (DE); Olga Schubert, Ludwigshafen (DE); Lothar Seidemann, Mannheim (DE); Martin Karches, Neustadt (DE); Thomas Grassler, Limburgerhof (DE); Eckhard Stroefer, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 497 days.

(21) Appl. No.: 11/816,045

(22) PCT Filed: Feb. 20, 2006

(86) PCT No.: PCT/EP2006/060105
§ 371 (c)(1),
(2), (4) Date: Aug. 10, 2007

(87) PCT Pub. No.: WO2006/089877
PCT Pub. Date: Aug. 31, 2006

(65) Prior Publication Data
US 2008/0159948 A1    Jul. 3, 2008

(30) Foreign Application Priority Data
Feb. 23, 2005  (DE) .................. 10 2005 008 612

(51) Int. Cl.
*C01B 7/04* (2006.01)
(52) U.S. Cl. ............. 423/502; 423/507; 95/45; 95/48
(58) Field of Classification Search ............ 423/502, 423/507; 95/45, 48
See application file for complete search history.

(56) References Cited

U.S. PATENT DOCUMENTS

| | | | |
|---|---|---|---|
| 4,774,070 A * | 9/1988 | Itoh et al. | 423/502 |
| 4,842,620 A * | 6/1989 | Hammel et al. | 95/47 |
| 5,861,049 A | 1/1999 | Lokhandwala | |
| 6,152,986 A * | 11/2000 | Foller | 95/47 |
| 6,387,345 B1 | 5/2002 | Gestermann et al. | |
| 2006/0099138 A1* | 5/2006 | Walsdorff et al. | 423/502 |
| 2007/0286793 A1* | 12/2007 | Weber et al. | 423/500 |

FOREIGN PATENT DOCUMENTS

| | | |
|---|---|---|
| EP | 0 765 838 | 4/1997 |
| WO | 2004 037718 | 5/2004 |

OTHER PUBLICATIONS

U.S. Appl. No. 12/446,460, filed Apr. 21, 2009, Boehling, et al.

* cited by examiner

*Primary Examiner* — Ngoc-Yen Nguyen
(74) *Attorney, Agent, or Firm* — Oblon, Spivak, McClelland, Maier & Neustadt, L.L.P.

(57) ABSTRACT

A catalytic process for preparing chlorine from hydrogen chloride, which includes recycle of process streams with reduced accumulation of inert gases in the system is provided. The process includes a step wherein a compressed liquid stream comprising chlorine, carbon dioxide and oxygen is recycled into a column countercurrent to the ascending gas phase and feeding part of the chlorine-rich liquid phase leaving the bottom of the column back into the top of the column. Carbon dioxide present in the ascending gas stream is dissolved out of the gas stream and can later be separated from chlorine without problems by distillation.

4 Claims, 3 Drawing Sheets

METHOD FOR PRODUCING CHLORINE

Figure 1:
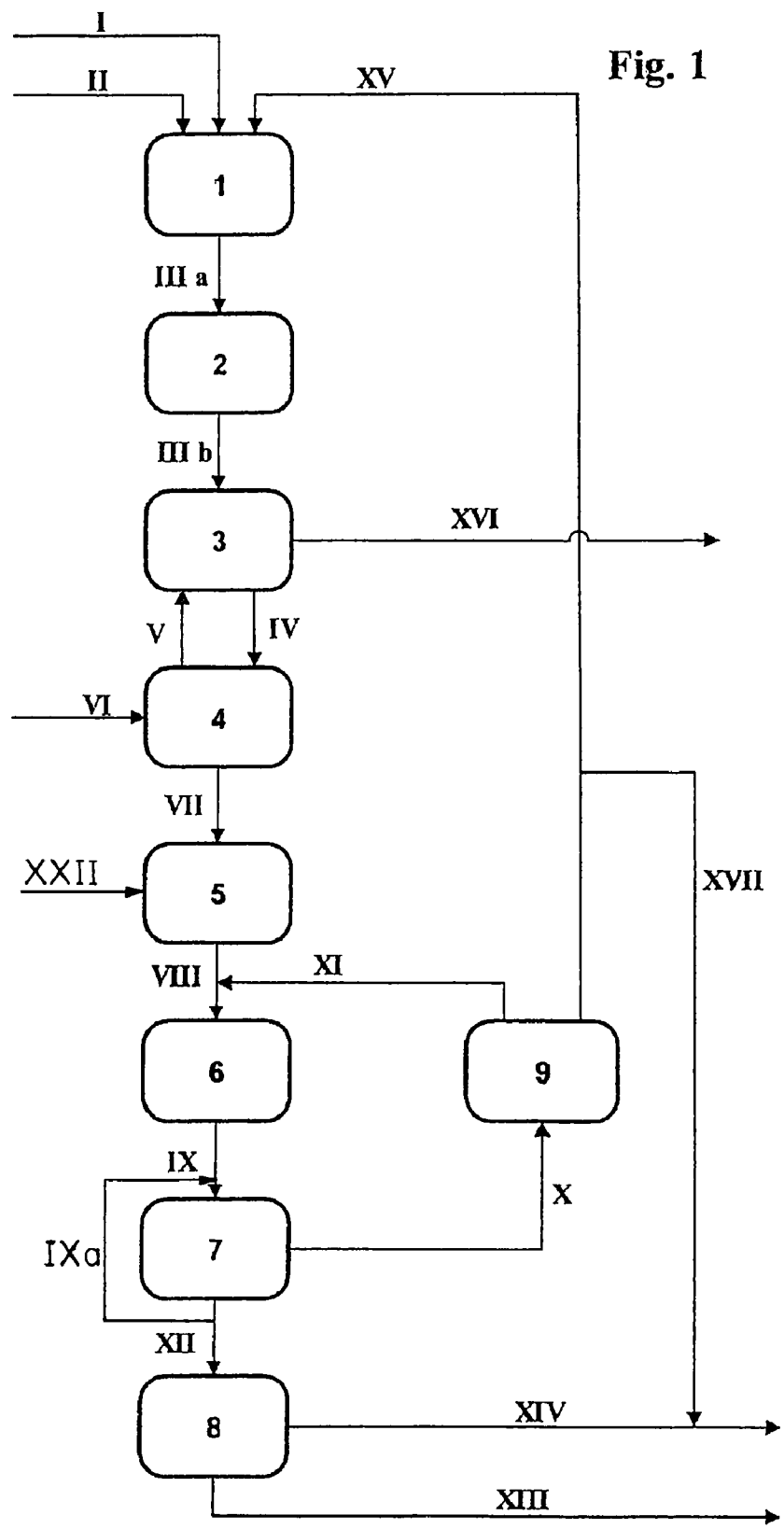

The invention relates to a process for preparing chlorine by catalytic oxidation of hydrogen chloride.

In the process developed by Deacon in 1868 for the catalytic oxidation of hydrogen chloride, hydrogen chloride is oxidized to chlorine by means of oxygen in an exothermic equilibrium reaction. The conversion of hydrogen chloride into chlorine enables chlorine production to be decoupled from the production of sodium hydroxide by chloralkali electrolysis. Such decoupling is attractive since the world demand for chlorine is growing more quickly than the demand for sodium hydroxide. In addition, hydrogen chloride is obtained in large quantities as coproduct in, for example, phosgenation reactions, for example in isocyanate production. The hydrogen chloride formed in isocyanate production is mostly used in the oxychlorination of ethylene to 1,2-dichlorethane, which is further processed to vinyl chloride and finally to PVC.

EP-A 0 765 838 discloses a process for working up the reaction gas comprising chlorine, hydrogen chloride, oxygen and water vapor which is formed in the oxidation of hydrogen chloride, in which the reaction gas leaving the oxidation reactor is cooled to such an extent that water of reaction and hydrogen chloride condense out in the form of concentrated hydrochloric acid, the concentrated hydrochloric acid is separated off from the reaction gas and is discharged, the remaining reaction gas which has been freed of virtually all the water and part of the hydrogen chloride is dried, the dried reaction gas comprising chlorine, oxygen and hydrogen chloride is compressed to from 1 to 30 bar and the compressed reaction gas is cooled and thus mostly liquefied, with components of the reaction gas which cannot be condensed out being at least partly recirculated to the oxidation reactor.

To separate off the chlorine, the dried and compressed reaction gas mixture is liquefied in a chlorine recuperator configured as an expansion cooler to leave only a small residual proportion of from about 10 to 20%. The main liquid chlorine stream which has been separated off in the chlorine recuperator is subsequently purified further in a distillation column in which the chlorine is freed of residual dissolved hydrogen chloride, oxygen and inert gases. The gas comprising essentially hydrogen chloride, chlorine, oxygen and inert gases which is taken off at the top of the distillation column is recirculated to the compression stage. The gas components which are not condensed out in the chlorine recuperator, including the residual proportion of chlorine, are partly liquefied at a significantly lower temperature in an after-cooling stage. The remaining offgas comprising unreacted hydrogen chloride, oxygen and inert gases is recycled to the oxidation reactor. Part of the recycled gas is separated off as a purge stream and is discharged from the process to prevent accumulation of impurities.

The hydrogen chloride used in the Deacon reaction is frequently gaseous hydrogen chloride obtained as coproduct in other production processes, for example in isocyanate production.

A disadvantage of the processes of the prior art in which chlorine is separated off from the chlorine-comprising product gas stream from the oxidation of hydrogen chloride exclusively by condensation is that very low temperatures are required in order to free the product gas stream of most of the chlorine. In addition, the residual gas stream comprising the uncondensable gas constituents still comprises considerable amounts of inert gases including carbon dioxide. In the recirculation of the oxygen-comprising residual gas stream to the hydrogen chloride oxidation reactor, these would accumulate to impermissibly high levels, so that a purge stream has to be separated off from this residual gas stream and discharged from the process before the residual gas stream is recirculated to the oxidation of hydrogen chloride. However, this purge stream still comprises appreciable amounts of chlorine, since the chlorine is only incompletely separated off by condensation. Thus, appreciable amounts of chlorine are lost in the purge stream.

It is an object of the invention to provide an improved process for preparing chlorine from hydrogen chloride, and in particular to remedy the disadvantages of the prior art.

This object is achieved by a process for preparing chlorine from hydrogen chloride, which comprises the steps:

a) feeding of a stream a1 comprising hydrogen chloride and of a stream a2 comprising oxygen into an oxidation zone and catalytic oxidation of hydrogen chloride to chlorine, giving a product gas stream a3 comprising chlorine, water, oxygen, carbon dioxide and possibly inert gases;

b) cooling of the product gas stream a3 and removal of water and hydrogen chloride as aqueous hydrochloric acid, leaving a gas stream b comprising chlorine, water, oxygen, carbon dioxide and possibly inert gases;

c) optional drying of the gas stream b) to leave a gas stream c which is substantially free of water and comprises chlorine, oxygen, carbon dioxide and possibly inert gases;

d) at least partial liquefaction of the gas stream c and of a chlorine-rich recycle stream f1 comprising chlorine, oxygen and carbon dioxide by compression and cooling, giving an at least partially liquefied stream d;

e) gas/liquid separation of the stream d into a gas stream e1 comprising chlorine, oxygen, carbon dioxide and possibly inert gases and a liquid stream e2 comprising chlorine, oxygen and carbon dioxide;

f) feeding of at least part of the gas stream e1 into a membrane separation unit and fractionation by membrane separation to give the chlorine-rich recycle stream f1 and a gas stream f2 which is low in chlorine and comprises chlorine, oxygen and carbon dioxide and recirculation of the chlorine-rich recycle stream f1 to step d);

g) separation of the liquid stream e2 by distillation into a chlorine stream g1 and a stream g2 comprising essentially oxygen and carbon dioxide.

The feed gas stream a1 comprising hydrogen chloride which is used in the process step a) is usually an HCl-comprising stream which is obtained as off-stream in a process in which hydrogen chloride is formed as coproduct. Said processes are, for example, (1) isocyanate production from phosgene and amines,
(2) acid chloride production,
(3) polycarbonate production,
(4) production of vinyl chloride from ethylene dichloride,
(5) chlorination of aromatics.

The HCl-comprising feed gas stream a1 can comprise secondary constituents. It usually comprises water-insoluble impurities which can be either organic or inorganic in nature. Organic impurities are, for example, hydrocarbons or chlorinated hydrocarbons. Typical hydrocarbons which may be present in the HCl-comprising feed gas streams used according to the invention comprise aromatics such as benzene, toluene, xylenes and $C_6$-$C_{12}$-aliphatics. Typical chlorinated hydrocarbons comprise phosgene, carbon tetrachloride, vinyl chloride and dichloroethane. The hydrocarbons and chlorinated hydrocarbons can be present in amounts up to 20% by volume, in general up to 30 000 ppm, preferably in amounts of up to 10 000 ppm and in particular in amounts of from 100 to 3000 ppm. Inorganic secondary constituents which can be present are, for example, carbon monoxide, carbon dioxide, nitrogen and further inert gases, generally in amounts of up to 10% by volume, preferably in amounts of up to 1% by volume.

The HCl-comprising feed stream a1 is preferably prepurified by passage over a purification bed and adsorption of hydrocarbons present in it on the purification bed before it is introduced into the oxidation zone. The purification bed comprises suitable adsorbents, preferably in the form of bodies such as spheres, extrudates or pellets. Suitable materials which can be used as adsorbents are, for example, activated carbon, aluminum oxide, titanium oxide, silicon dioxide, iron oxide, zeolites and molecular sieves. Suitable materials can also comprise metal oxides or metal halides, e.g. copper or ruthenium oxides or halides or mixtures thereof, on a support comprising a refractory inorganic material such as aluminum oxide, titanium oxide or silicon dioxide. Preferred adsorbents are aluminum oxide, activated carbon and clay minerals.

In the oxidation step a, the stream a1 comprising hydrogen chloride is fed together with a stream a2 comprising oxygen into an oxidation zone and is oxidized catalytically.

In the catalytic process also known as the Deacon process, hydrogen chloride is oxidized to chlorine by means of oxygen in an exothermic equilibrium reaction, with water vapor being formed. Customary reaction temperatures are in the range from 150 to 500° C., and customary reaction pressures are in the range from 1 to 25 bar. It is also advantageous to use oxygen in superstoichiometric amounts. It is usual to use, for example, a two- to four-fold excess of oxygen. Since no decreases in selectivity are to be feared, it can be economically advantageous to work at relatively high pressures and accordingly at residence times which are longer than those employed under atmospheric pressure.

Suitable catalyst comprise, for example, ruthenium oxide, ruthenium chloride or other ruthenium compounds on silicon dioxide, aluminum oxide, titanium dioxide or zirconium dioxide as support. Suitable catalysts can be obtained, for example, by application of ruthenium chloride to the support and subsequent drying or drying and calcination. Suitable catalysts can further, in addition to or in place of a ruthenium compound, comprise compounds of other noble metals, for example gold, palladium, platinum, osmium, iridium, silver, copper or rhenium. Suitable catalysts can further comprise chromium(III) oxide.

Also suitable are catalysts which comprise, on a support, from 0.001 to 30% by weight of gold, from 0 to 3% by weight of one or more alkaline earth metals, from 0 to 3% by weight of one or more alkali metals, from 0 to 10% by weight of one or more rare earth metals and from 0 to 10% by weight of one or more further metals selected from the group consisting of ruthenium, palladium, platinum, osmium, iridium, silver, copper and rhenium, in each case based on the total weight of the catalyst.

Such gold-comprising supported catalysts have a higher activity in the oxidation of hydrogen chloride than the ruthenium-comprising catalysts of the prior art, especially at temperatures of $\leq 250°$ C.

Customary reaction apparatuses in which the catalytic oxidation of hydrogen chloride is carried out are fixed-bed or fluidized-bed reactors. The oxidation of hydrogen chloride can be carried out in a plurality of stages.

The catalytic oxidation of hydrogen chloride can be carried out adiabatically or preferably isothermally or approximately isothermally, batchwise or preferably continuously, as a fluidized-bed or fixed-bed process. It is preferably carried out in a fluidized-bed reactor at a temperature of from 320 to 400° C. and a pressure of 2-8 bar.

In the isothermal or approximately isothermal mode of operation, it is also possible to use a plurality of reactors, i.e. from 2 to 10, preferably from 2 to 6, particularly preferably from 2 to 5, in particular from 2 to 3 reactors, connected in series with additional intermediate cooling. Either the oxygen can all be added together with the hydrogen chloride before the first reactor or its addition can be distributed over the various reactors. This arrangement of individual reactors in series can also be combined in one apparatus.

One embodiment comprises using a structured catalyst bed in which the catalyst activity increases in the flow direction in the fixed-bed reactor. Such structuring of the catalyst bed can be achieved by different impregnation of the catalyst supports with active composition or by different dilution of the catalyst with an inert material. As inert materials, it is possible to use, for example, rings, cylinders or spheres of titanium dioxide, zirconium dioxide or mixtures thereof, aluminum oxide, steatite, ceramic, glass, graphite or stainless steel. In the case of the preferred use of shaped catalyst bodies, the inert material should preferably have similar external dimensions.

Any shapes are suitable as shaped catalyst bodies; preference is given to pellets, rings, cylinders, stars, spoked wheels or spheres, particularly preferably rings, cylinders or star extrudates.

Suitable heterogeneous catalysts are, in particular, ruthenium compounds or copper compounds on support materials, and these can also be doped, with preference being given to doped or undoped ruthenium catalysts. Suitable support materials are, for example, silicon dioxide, graphite, titanium dioxide having the rutile or anatase structure, zirconium dioxide, aluminum oxide or mixtures thereof, preferably titanium dioxide, zirconium dioxide, aluminum oxide or mixtures thereof, particularly preferably gamma- or alpha-aluminum oxide or mixtures thereof.

The supported copper or ruthenium catalysts can, for example, be obtained by impregnating the support material with aqueous solutions of $CuCl_2$ or $RuCl_3$ and, if appropriate, a promoter for doping, preferably in the form of their chlorides. Shaping of the catalyst can be carried out after or preferably before impregnation of the support material.

Promoters suitable for doping are alkali metals such as lithium, sodium, potassium, rubidium and cesium, preferably lithium, sodium and potassium, particularly preferably potassium, alkaline earth metals such as magnesium, calcium, strontium and barium, preferably magnesium and calcium, particularly preferably magnesium, rare earth metals such as scandium, yttrium, lanthanum, cerium, praseodymium and neodymium, preferably scandium, yttrium, lanthanum and cerium, particularly preferably lanthanum and cerium, or mixtures thereof.

The shaped bodies can subsequently be dried, and if appropriate calcined, at temperatures of from 100 to 500° C., preferably from 100 to 400° C., for example under a nitrogen, argon or air atmosphere. The shaped bodies are preferably firstly dried at from 100 to 200° C. and subsequently calcined at from 200 to 400° C.

The conversion of hydrogen chloride in a single pass can be limited to from 15 to 90%, preferably from 40 to 85%, particularly preferably from 50 to 80%. Unreacted hydrogen chloride can, after it has been separated off, be partly or wholly recirculated to the catalytic oxidation of hydrogen chloride. The volume ratio of hydrogen chloride to oxygen at the reactor inlet is generally from 1:1 to 20:1, preferably from 2:1 to 8:1, particularly preferably from 2:1 to 5:1.

In a step b), which can also be referred to as quenching and absorption step, the product gas stream a3 is cooled and water and hydrogen chloride are separated off from the product gas stream a3 as aqueous hydrochloric acid. The hot product gas stream a3 is cooled by bringing it into contact with a quenching medium, generally water or dilute hydrochloric acid, in a suitable phase contact apparatus, for example a packed column or tray column, a jet scrubber or a spray tower, with part of the hydrogen chloride generally being absorbed in the quenching medium. The product gas stream which has been cooled in this way is subsequently brought into contact with an absorption medium. Suitable absorption media are water and any dilute hydrochloric acid which is not saturated with hydrogen chloride. Preference is given to using water as absorption medium. The absorption temperature is usually from 0 to 150° C., preferably from 30 to 100° C., and the absorption pressure is usually from 0.5 to 20 bar, preferably from 1 to 10 bar. The resulting hydrochloric acid can be used as quenching medium for cooling the product gas stream a3.

The gas stream b leaving the quenching and absorption zone comprises chlorine, water, oxygen, carbon dioxide and in general also inert gases (mainly nitrogen). In addition, it can further comprise certain amounts of hydrogen chloride. This can be freed of moisture traces by bringing it into contact with suitable desiccants in a subsequent drying step c). Suitable desiccants are, for example, concentrated sulfuric acid, molecular sieves or hygroscopic adsorbents. A gas stream c which is substantially free of water and comprises chlorine, oxygen, carbon dioxide and possibly inert gases is obtained.

In a step d), the gas stream b or c and a chlorine-rich recycle stream f1 which comprises chlorine, oxygen and carbon dioxide and has been obtained by membrane separation (see below) is at least partly liquefied by compression and cooling. In general, the two streams are combined and compressed by means of single-stage or multistage compression to a pressure in the range from 5 to 50 bar and simultaneously cooled by means of single-stage or multistage cooling to a temperature in the range from 0 to −70° C. The streams can also be compressed and cooled separately, in which case one or more separately liquefied streams d can result.

In a subsequent gas/liquid separation e), the stream d is separated into a gas stream e1 comprising chlorine, oxygen, carbon dioxide and possibly inert gases and into a liquid stream e2 comprising chlorine, oxygen and carbon dioxide. This step is also referred to as "flash". The phase separation can be carried out by allowing the gas phase to separate from the liquid phase in a simple vessel. In a preferred embodiment, the gas/liquid separation is effected by introducing the compressed stream d into a column at the top and passing it through the column in countercurrent to the ascending gas phase and feeding part of the chlorine-rich liquid phase leaving the bottom of the column back into the top of the column and thus achieving partial circulation. Preference is given to from 0 to 80% by weight of the chlorine-rich liquid stream taken off at the bottom of the column being circulated, i.e. preferably returned to the column at the top. Carbon dioxide present in the ascending gas stream is dissolved out of the gas stream and can later be separated from chlorine without problems by distillation (together with remaining oxygen). This results in a gas stream e1 which is low in carbon dioxide and can be at least partly recirculated to the oxidation zone. Thus, the substreams which are separated off as purge streams from the streams e1 or f1 recirculated to the oxidation zone and are discharged from the process in order to prevent accumulation of carbon dioxide can remain comparatively small, as a result of which the loss of chlorine via the purge streams is also limited.

Strictly speaking, the steps d) and g), i.e. gas/liquid separation and distillation of the liquid phase e2 to give a pure chlorine stream g1, can also be carried out together in one column. However, preference is given to firstly carrying out the gas/liquid separation in a first column and subsequently carrying out the recovery of chlorine by distillation of the liquid phase in a further column. This results in an overall better separation and a chlorine stream g1 of higher purity.

The gas stream e1 which has been separated off generally comprises from 1 to 40 mol % of chlorine, from 1 to 80 mol % of oxygen, from 1 to 80 mol % of nitrogen, from 0 to 30 mol % of carbon dioxide and from 0 to 20 mol % of further constituents such as noble gases, carbon monoxide and hydrogen chloride.

The liquid stream e2 generally comprises from 80 to 100 mol % of chlorine, from 0 to 5 mol % of oxygen, from 0 to 30 mol % of carbon dioxide and from 0 to 30 mol % of further constituents such as noble gases, carbon monoxide and hydrogen chloride.

In a step f), at least part of the gas stream e1 is fed into a membrane separation unit and fractionated by membrane separation to give the chlorine-rich stream f1 and a gas stream f2 which is low in chlorine and comprises chlorine, oxygen and carbon dioxide. In one embodiment, the entire gas stream e1 is fed into the membrane separation unit. In a further embodiment, only part of the gas stream e1 is fed into the membrane separation unit and a further part is recirculated directly to the oxidation zone (step a)). The ratio of these substreams can be made variable. Thus, when the flow through the membrane decreases as a result of aging of the latter, the substream of the stream e1 recirculated directly to the oxidation zone can be augmented.

The temperature of the gas stream e1 is generally <10° C., preferably <−5° C., particularly preferably <−20° C. The pressure on the retentate side of the membrane separation unit is generally from 5 to 50 bar, preferably from 15 to 35 bar. The membrane separation thus also makes use of the fact that the compressed gas stream e1 which has been separated off by gas/liquid separation is under a high pressure. The pressure on the permeate side of the membrane separation unit is generally from 1 to 15 bar, preferably from 1 to 10 bar, particularly preferably from 1 to 5 bar.

The fractionation to give a chlorine-rich substream and a substream which is low in chlorine can be brought about either by means of membranes which have a permselectivity for chlorine, i.e. allow chlorine to permeate more readily than the other gas constituents, or by means of membranes which allow the other gas constituents, in particular nitrogen and oxygen, to permeate more readily than chlorine. In a multistage membrane separation, a combination of a plurality of different membranes, with membranes of the two types being able to be combined, is also possible. Membranes of the first-named type are described, for example, in U.S. Pat. No. 5,538,535, and membranes of the latter type are described, for example, in WO 2001/02290.

The separation-active layers of the membranes can comprise polymers or inorganic materials such as carbon or ceramic materials. In the process of the invention, particular preference is given to using membranes in which a chlorine-enriched stream is obtained as permeate and a stream depleted in chlorine is obtained as retentate. The separation-active layers of such membranes generally comprise polymers. Preference is given to polymers which have a low degree of crystallinity or whose glass transition temperatures are even lower than the operating temperature of the membrane separation unit. Block copolymers having at least one phase which displays the abovementioned properties are also suitable.

Examples of suitable polymers are silicone rubber, preferably polydimethylsiloxane (PDMS), particularly preferably crosslinked PDMS. Also suitable are perfluorinated polymers and their copolymers and also polyolefin copolymers such as ethylene-propylene-diene terpolymer (EPD) and ethylene-propylene copolymer (EPM), which are sufficiently stable toward chlorine. The separation-active layer can be a dense layer or a microporous layer.

The separation-active layers are usually applied to single-layer or multilayer supports which are stable toward chlorine or are located in the pores of porous supports. Such supports can comprise stable polymers such as polytetrafluoroethene (PTFE) or polyvinylidene fluoride (PVDF) or inorganic materials such as metal, glass, carbon or ceramic.

The membranes are usually used in pressure-tight housings which allow a separation between retentate space and permeate space at the pressure conditions required. The membranes can have a flat geometry, a tubular geometry, a multichannel element geometry a capillary geometry or a wound geometry, for which appropriate pressure housings which allow separation between retentate and permeate are available. A plurality of these elements can be combined in one housing to form a module.

A chlorine-rich stream f1 which generally comprises from 5 to 50 mol %, preferably from 15 to 30 mol %, of chlorine is obtained. The stream f2 which is low in chlorine generally still has a chlorine content of from 0.1 to 5 mol %, preferably from 0.1 to 3 mol %, particularly preferably from 0.1 to 1 mol %.

The chlorine-rich stream f1 is recirculated as recycle stream to the cooling and compression step d).

The stream f2 which is low in chlorine can be discharged as offgas stream from the process or be at least partly recirculated to the oxidation zone (step a)). The stream f2 which is low in chlorine can be wholly or only partly recirculated to the oxidation zone, and in the latter case a further substream is discharged as purge stream from the process.

The liquid stream e2 obtained in the gas/liquid separation is subsequently fractionally distilled to give a chlorine stream g1 and a stream g2 which comprises essentially oxygen and carbon dioxide. The distillation is generally carried out in a distillation column having, for example, from 5 to 30 theoretical plates at a temperature in the range from −50° C. to +90° C. and a pressure in the range from 4 to 40 bar. The chlorine stream g1 obtained in this way generally has a chlorine content of from 95 to 100 mol %. The stream g2 which comprises essentially oxygen and carbon dioxide and in which these two components are generally present in an amount of at least 50 mol % is discharged from the process as offgas stream.

The invention is illustrated below with the aid of the drawings.

FIG. 1 schematically shows an embodiment of the process of the invention.

A hydrogen chloride stream I and a stream II comprising technical-grade oxygen are fed into the hydrogen chloride oxidation zone comprising a main reactor 1 configured as a fluidized-bed reactor and an after-reactor 2 configured as a fixed-bed reactor to which the reactor effluent IIIa of the main reactor is fed. The product gas mixture IIIb leaving the after-reactor 2, which comprises essentially chlorine, water vapor, oxygen, hydrogen chloride and carbon dioxide, is brought into contact with cooled, dilute hydrochloric acid V in a phase contact apparatus 3, for example a packed column, a jet scrubber or a spray tower, giving a stream XVI of more highly concentrated hydrochloric acid (having an HCl content of from 20 to 35% by weight). The off-stream IV, which still comprises HCl, is brought into contact with water VI in the absorption column 4, for example a packed column or tray column, giving a stream of dilute hydrochloric acid (having an HCl content of from 1 to 15% by weight) V which is cooled and conveyed as quenching medium into the phase contact apparatus 3. The stream VII leaving the hydrogen chloride absorption column 4 comprises essentially chlorine, oxygen and carbon dioxide and still comprises traces of water. This stream is brought into contact with concentrated $H_2SO_4$ XXII in a tray column or packed column 5 in order to remove traces of water. The resulting, virtually water-free stream VIII is subsequently compressed to a pressure of from about 15 to 35 bar and cooled to a temperature of from about −20 to −50° C. in the compression and cooling stage 6 comprising a multi-stage compressor with intermediate cooling (coolant: water) followed by a heat exchanger (with brine cooling), resulting in the major part of the chlorine being liquefied. The resulting, partially liquefied stream IX is fed into the phase separation apparatus 7. This is preferably configured as a packed column, with the stream IX being introduced at the top of the column and part of the chlorine-rich liquid phase taken off at the bottom of the column IXa being circulated, i.e. being reintroduced at the top of the column. The gas phase X which has been separated off comprises essentially chlorine, oxygen and carbon dioxide. This stream X is fed into a membrane separation unit 9 and fractionated there to give a chlorine-rich stream XI which comprises essentially oxygen and carbon dioxide, and a stream XV which is low in chlorine and comprises predominantly oxygen and also some carbon dioxide. The chlorine-rich stream XI is recirculated to upstream of the compression and cooling stage 6. A purge stream XVII is separated off from the stream XV and discharged from the process. However, the major part of the stream XV is recirculated to the main reactor 1. The liquid chlorine stream XII leaving the bottom of the phase separation apparatus, which still comprises carbon dioxide and oxygen, is fed into the distillation column 8. This is, for example, configured as a tray column having from 10 to 20 theoretical plates and is operated at a temperature of from −50 to +90° C. and a pressure of from 4 to 40 bar. This results in a pure chlorine stream XIII having a chlorine content of >95% by weight as bottom offtake stream and an off-stream XIV which comprises carbon dioxide and oxygen and only very small amounts of chlorine (typically <5% by volume) and is discharged from the process.

Figure 2:
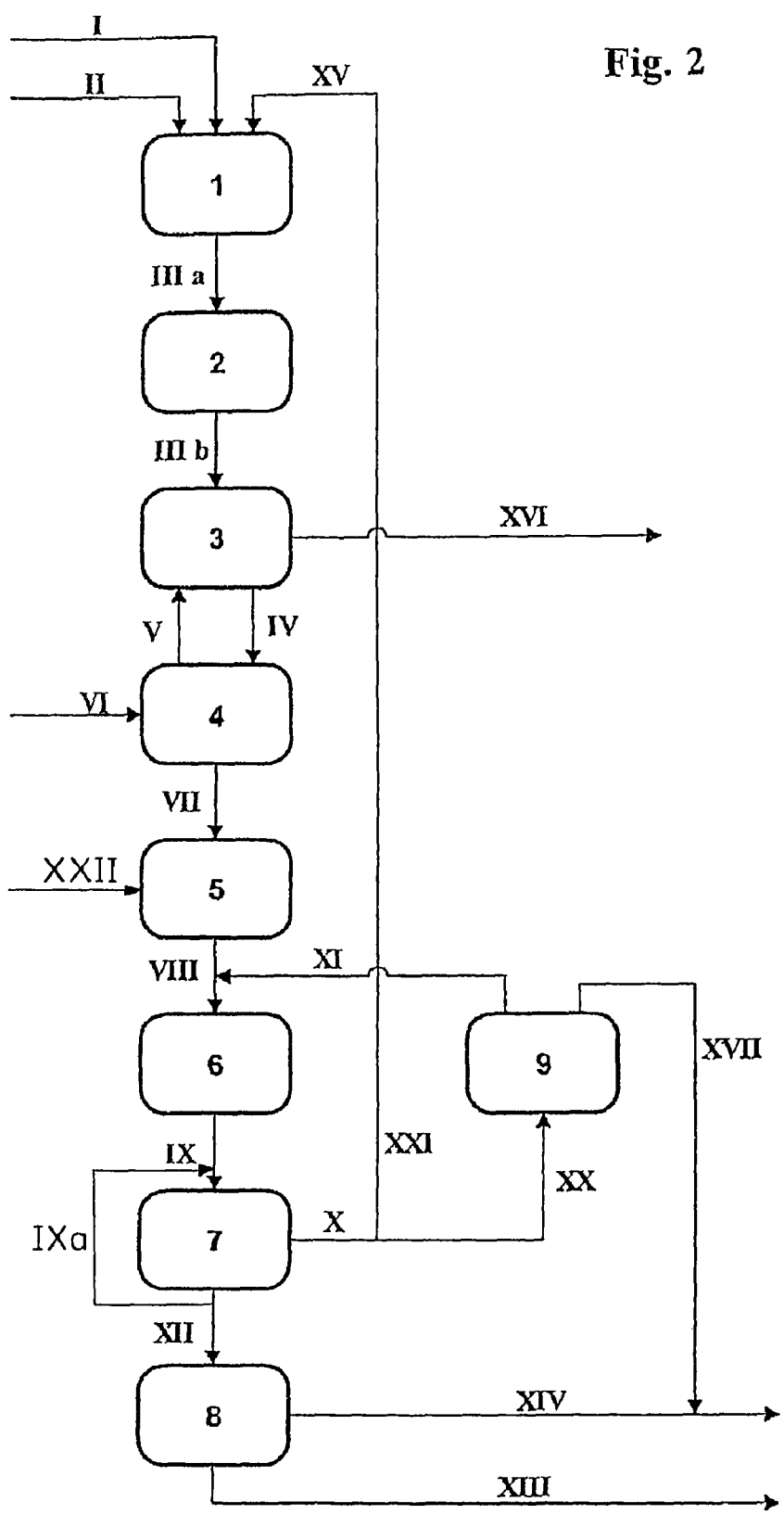

FIG. 2 schematically shows a further embodiment of the process of the invention.

As a difference from the process shown in FIG. 1, a substream XXI is separated off from the gas phase X obtained by means of gas/liquid separation and is recirculated directly to the main reactor 1. A further substream XX is fed to the membrane separation unit 9, with the resulting stream which is low in chlorine being discharged from the process as purge stream XVII.

Figure 3:
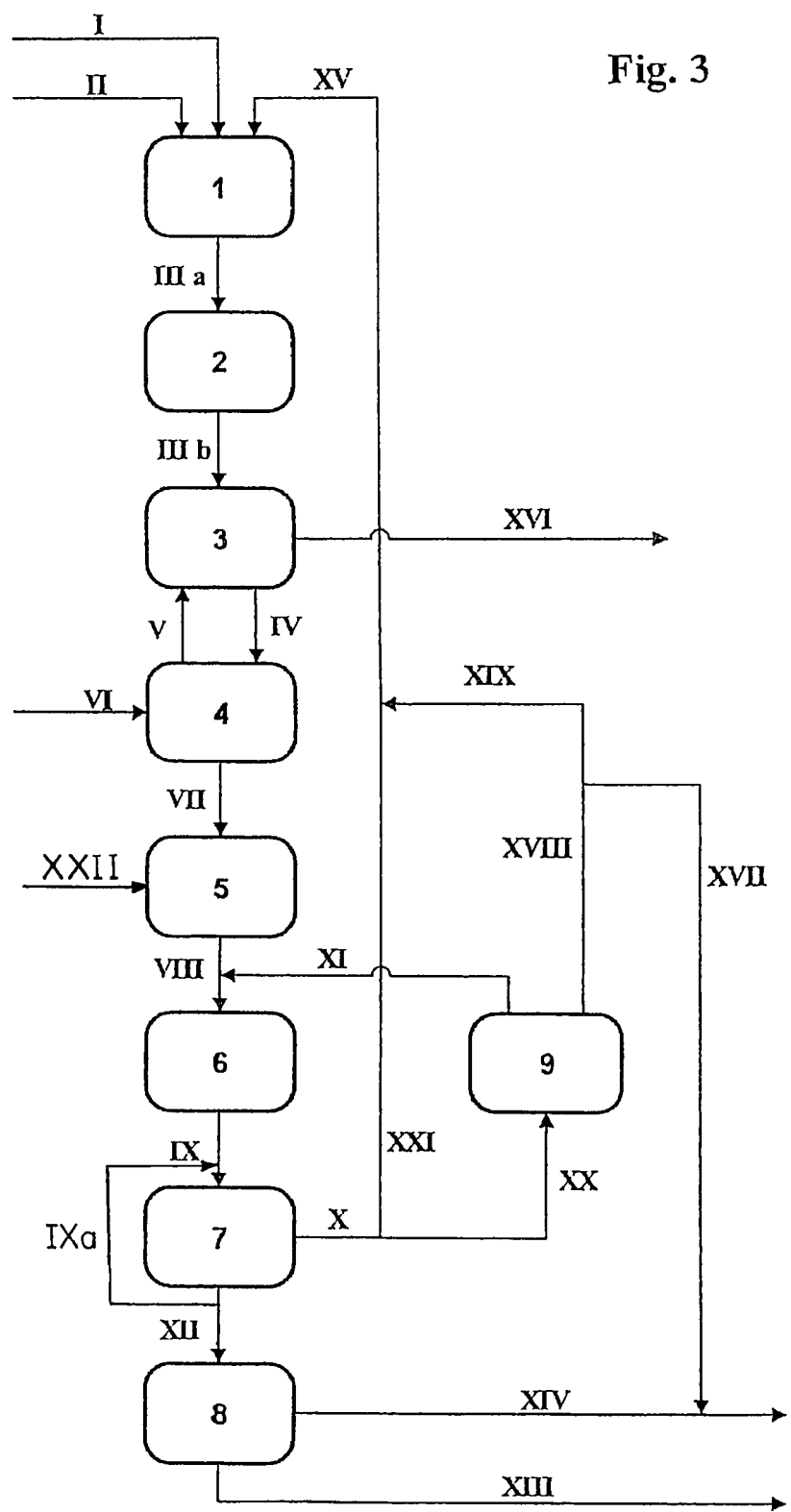

FIG. 3 schematically shows a further embodiment of the process of the invention.

As a difference from the process shown in FIG. 2, a first substream XVII of the stream XVIII which is low in chlorine and is obtained by means of membrane separation is discharged from the process as purge stream, and a second substream XIX is recirculated to the main reactor 1.

The invention claimed is:

1. A process for preparing chlorine from hydrogen chloride, which comprises:
   a) feeding of a stream a1 comprising hydrogen chloride and of a stream a2 comprising oxygen into an oxidation zone to effect catalytic oxidation of hydrogen chloride to chlorine, giving a product gas stream a3 comprising chlorine, water, oxygen, carbon dioxide and inert gases;

b) cooling the product gas stream a3 to effect removal of water and hydrogen chloride as aqueous hydrochloric acid, leaving a gas stream b comprising chlorine, water, oxygen, carbon dioxide and inert gases;

c) drying the gas stream b) to leave a gas stream c which is substantially free of water and comprises chlorine, oxygen, carbon dioxide and inert gases;

d) effecting at least partial liquefaction of the gas stream c and of a chlorine-rich recycle stream f1 comprising chlorine, oxygen and carbon dioxide by compression and cooling, giving an at least partially liquefied stream d;

e) separating compressed stream d into gas stream e1 comprising chlorine, oxygen, carbon dioxide and inert gases and liquid stream e2 comprising chlorine, oxygen and carbon dioxide, by introducing said compressed stream d into the top of a column and recirculating part of the liquid stream e2 to the top of the column, with the oxygen dissolved in the liquid stream e2 and any dissolved inert gases being stripped out of the recirculated descending liquid stream e2 by a gas stream ascending in the column, and carbon dioxide present in the ascending gas stream being simultaneously dissolved out of the gas stream by the descending liquid stream wherein at least part of the gas stream e1 and/or a gas stream f2 which is low in chlorine and comprises chlorine, oxygen and carbon dioxide is recirculated into the oxidation zone;

f) feeding of at least part of the gas stream e1 into a membrane separation unit and fractionating by membrane separation to give the chlorine-rich recycle stream f1 and a gas stream f2 which is low in chlorine and comprises chlorine, oxygen and carbon dioxide and recirculating said chlorine-rich recycle stream f1 to the compression and cooling d); and g) separating liquid stream e2 by distillation into a chlorine stream g1 and a stream g2 consisting essentially of oxygen and carbon dioxide, wherein at least part of the gas stream e1 and/or f2 is recirculated to the oxidation zone a).

2. The process according to claim 1, wherein stream f2 which is low in chlorine is at least partly recirculated to the oxidation zone a).

3. The process according to claim 2, wherein part of the stream f2 which is low in chlorine is discharged from the process.

4. The process according to claim 1, wherein part of the stream e1 is recirculated to the oxidation zone a).

* * * * *